United States Patent
Doihara et al.

(10) Patent No.: US 6,486,863 B1
(45) Date of Patent: Nov. 26, 2002

(54) APPARATUS FOR CONTROLLING DISPLAY AND METHOD FOR GRADATION CONVERSION

(75) Inventors: Hiroshi Doihara, Tokyo (JP); Hirotaka Sakaguchi, Tokyo (JP); Hajime Terada, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/367,768

(22) Filed: Jan. 3, 1995

Related U.S. Application Data

(63) Continuation of application No. 08/049,849, filed on Apr. 20, 1993, now abandoned.

(30) Foreign Application Priority Data

Apr. 27, 1992 (JP) .............................. 4-134120

(51) Int. Cl.[7] .................................. G09B 3/36
(52) U.S. Cl. ........................ 345/89; 345/589; 345/690; 345/692
(58) Field of Search .................................. 345/147, 148, 345/149, 150, 153, 87, 89, 589, 596, 599, 598, 690, 691, 692, 694

(56) References Cited

U.S. PATENT DOCUMENTS

| | | | |
|---|---|---|---|
| 4,779,908 A | * 10/1988 | Ishii et al. ................... | 340/793 |
| 5,023,603 A | * 6/1991 | Wakimoto et al. .......... | 340/793 |

FOREIGN PATENT DOCUMENTS

| | | | |
|---|---|---|---|
| DE | 3240473 A1 | 5/1984 | ............ G09G/1/06 |
| EP | 0 387 550 | 2/1990 | ............ G09G/5/02 |
| EP | 0 414 159 A2 | 8/1990 | ............ H03G/7/00 |
| EP | 0 476 817 A1 | 8/1991 | .......... H04N/5/202 |
| FR | 2 417 901 | 9/1979 | ............ H04N/5/14 |
| GB | 2121584 A | 12/1983 | ............ G09G/3/36 |
| JP | 58-150375 | 9/1993 | ............ H04N/5/20 |

OTHER PUBLICATIONS

Patent Abstracts of Japan, vol. 7, No. 36 (E–158) Feb. 15, 1983 & JP–A–57 188 182 (SUWA seikosha k.k.) Nov. 19, 1982 *abstract*.

Patent Abstracts of Japan, vol. 16, No. 117 (P–1328) Mar. 24, 1993 & JP–A–32 86 486 (Mitsubishi Electric Corp.) Dec. 17, 1991 *abstract*.

* cited by examiner

*Primary Examiner*—Dennis-Doon Chow
(74) *Attorney, Agent, or Firm*—Oblon, Spivak, McClelland, Maier & Neustadt, P.C.

(57) ABSTRACT

Brightness of input data ranging from 0 to 20% (brightness close to black) is converted to gradation Y0 (black) and brightness ranging from 80 to 100% (brightness close to white) is converted to gradation Y7 (white). Ranges of brightness from 20 to 35%, 35 to 45%, 45 to 50%, 50 to 55%, 55 to 65%, and 65 to 80% are converted to gradations Y1 to Y6, respectively. While brightness of the input data is converted to eight gradations which an LCD can display, intervals of brightness assigned to each of gradations are so specified that they are narrower around medium brightness (around 50%) than around the minimum (0%) or maximum (100%) brightness, i.e., the conversion is performed in a nonlinear manner.

9 Claims, 11 Drawing Sheets

FIG. 14

| | | |
|---|---|---|
| Y7 | (87.5 – 100%) | |
| Y6 | (75 – 87.5%) | * |
| Y5 | (62.5 – 75%) | * * |
| Y4 | (50 – 62.5%) | * * * * * * * * * |
| Y3 | (37.5 – 50%) | * * * * * * * * * * * |
| Y2 | (25 – 37.5%) | * * * |
| Y1 | (12.5 – 25%) | * |
| Y0 | (0 – 12.5%) | |

FIG. 15

| | | |
|---|---|---|
| Y7 | (80 – 100%) | * |
| Y6 | (65 – 80%) | * * |
| Y5 | (55 – 65%) | * * * * * * * |
| Y4 | (50 – 55%) | * * |
| Y3 | (45 – 50%) | * * * * * * * * |
| Y2 | (35 – 45%) | * * * * |
| Y1 | (20 – 35%) | * * * |
| Y0 | (0 – 20%) | * |

APPARATUS FOR CONTROLLING DISPLAY AND METHOD FOR GRADATION CONVERSION

This is a continuation of application Ser. No. 08/049,849 filed on Apr. 20, 1993 now abandoned.

BACKGROUND OF THE INVENTION

The present invention relates to a display controlling apparatus suitable for use in a reproducing apparatus for reproducing a CD-ROM for example in the XA format.

A video signal is intrinsically an analog signal and has substantially infinite number of gradations (stepless gradation). Therefore, when a circuit for processing a video signal is formed of an analog circuit, the image can be displayed substantially in stepless gradation and the image obtained is relatively easy to see. However, with information processing apparatuses such as personal computers, it is, often the case that the circuit for processing the video signal is formed of a digital circuit. In such case, the image is displayed with a predetermined number (finite number) of gradations.

In dividing brightness of a video signal into a predetermined number (finite number) of gradations, it has conventionally been practiced to divide it in a linear manner. Namely, the brightness has been divided into even ranges of gradation. As a result, there has been a problem that pixels concentrate in narrow ranges of gradation and, hence, the image becomes difficult to see.

SUMMARY OF THE INVENTION

The present invention was made in view of the above situation and it is an object of the present invention to achieve gradation conversion such that an image which is easier to see is obtained.

The display controlling apparatus according to the present invention comprises a D-RAM 97 as data storage means for storing video data corresponding to an image to be displayed, an interface LSI 95 as gradation conversion means for converting brightness of video data into a predetermined number of gradations in a nonlinear manner, and an LCD/CRT controller 94 as output means for outputting video data converted by the interface LSI 95 so as to have a predetermined number of gradations.

In the display controlling apparatus with the above described arrangement, video data stored in the D-RAM 97 is converted in a nonlinear manner into data with a predetermined number of gradations. Accordingly, pixels are scatteredly distributed over wider ranges of gradations and, hence, an image which is easier to see can be obtained.

Further, according to the method for gradation conversion with the above described arrangement, color data is converted into luminance data and the luminance data is converted in a nonlinear manner into data with a predetermined number of gradations. Accordingly, a color image can be simply converted to a monochromatic image which is easier to see.

BRIEF DESCRIPTION OF THE DRAWINGS

FIG. 14 is a diagram explanatory of distribution of data when brightness is linearly converted into eight gradations; and FIG. 15 is a diagram explanatory of distribution of data when brightness is nonlinearly converted into eight gradations.

DESCRIPTION OF THE PREFERRED EMBODIMENTS

Figure 1:
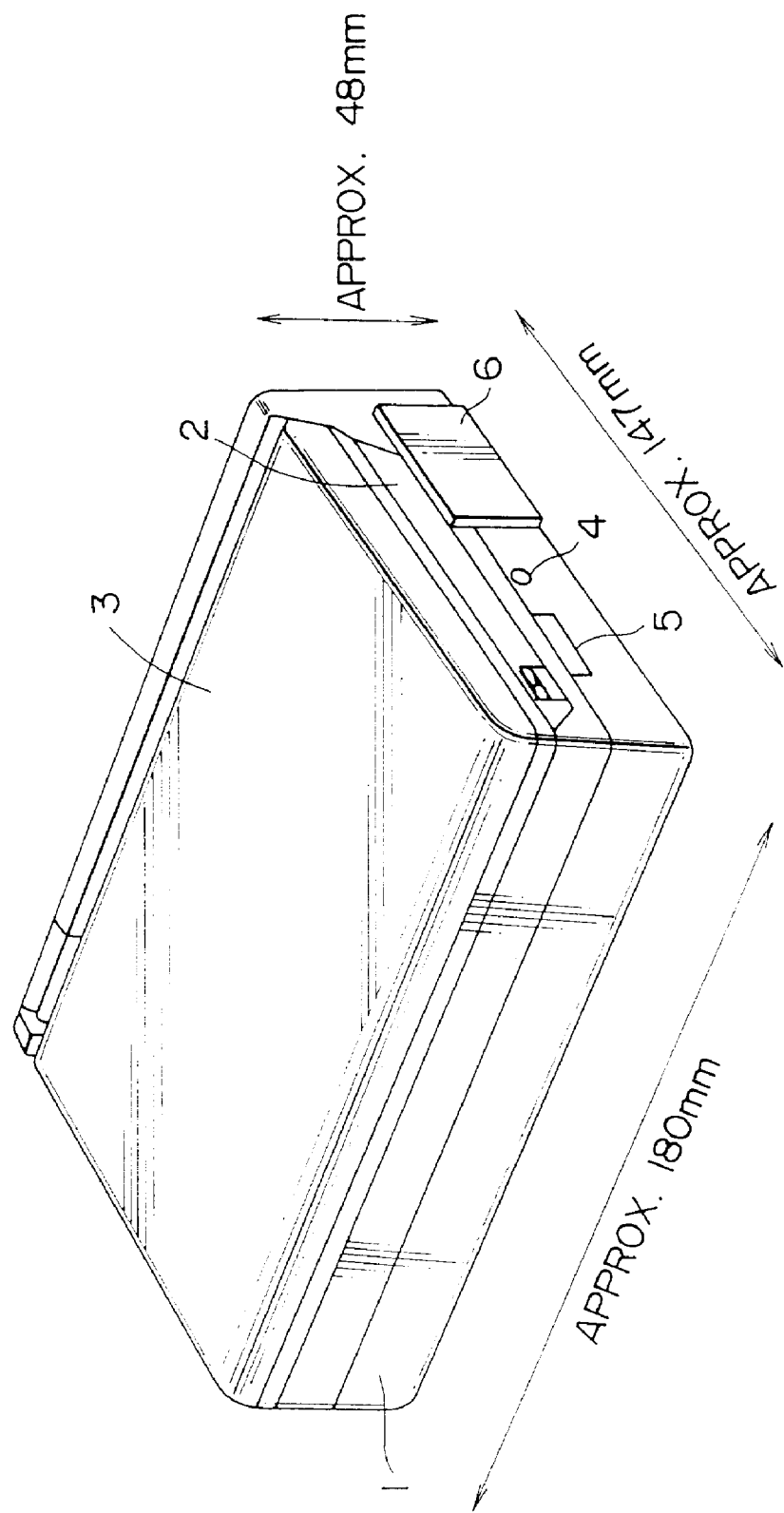
FIG. 1 is a perspective view showing an external structure of a CD-ROM reproducing apparatus with a display controlling apparatus of the present invention applied thereto.

FIG. 1 to FIG. 4 are diagrams showing external structure of an embodiment of a CD-ROM reproducing apparatus to which a display controlling apparatus according to the present invention is applied. The reproducing apparatus is basically constructed of a housing 1, an inner lid 2 and an outer lid 3 rotatably fixed to the housing 1. These components are all formed of synthetic resin. The apparatus, as shown in FIG. 1, is approximately 180 mm wide, approximately 48 mm high, and approximately 147 mm deep, and arranged in a portable size like a notebook computer.

Figure 2:
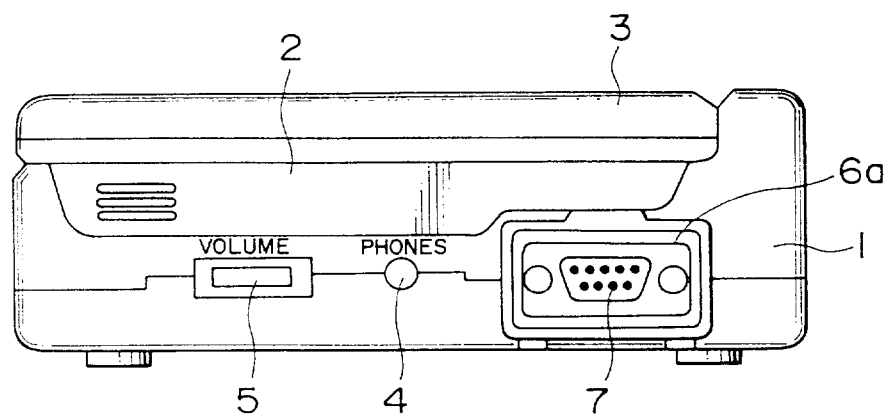
FIG. 2 is a right-hand: side view of the embodiment of FIG. 1.

As shown in FIG. 1 and FIG. 2, on the right-hand side face of the housing 1, there are provided a jack 4 for connecting a headphone (not shown) thereto and a volume button 5 for controlling the level of an audio signal output to the headphone or an incorporated speaker 37 (described later with reference to FIG. 6). There is further provided, on the right-hand side of the housing 1, a plug 7 for connecting an RS232C cable thereto so that data can be exchanged between the inside and an external apparatus. When the RS232C cable is not connected, the hole 6a in which the plug 7 is provided is blocked up with a rubber cap 6 to prevent dust or the like from getting inside.

Figure 3:
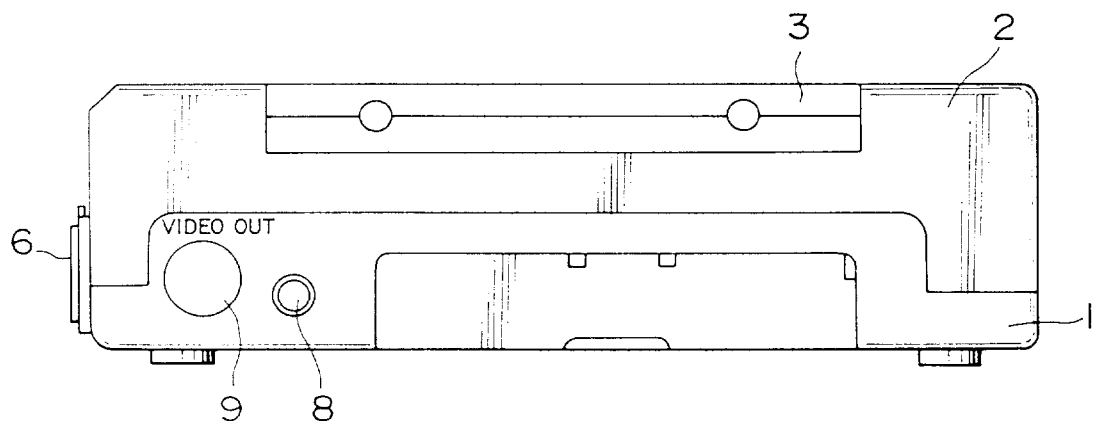
FIG. 3 is a rear view of the embodiment of FIG. 1.

On the rear face of the housing 1, as shown in FIG. 3, there is provided a jack 8 for supplying DC power to the circuit (described later with reference to FIG. 9) inside the housing 1. Adjacent to the jack 8, there is provided a video output terminal 9 from which a video signal reproduced from a CD-ROM 66 (described later with reference to FIG. 7) loaded in the housing 1 can be output to an external apparatus.

Figure 4:
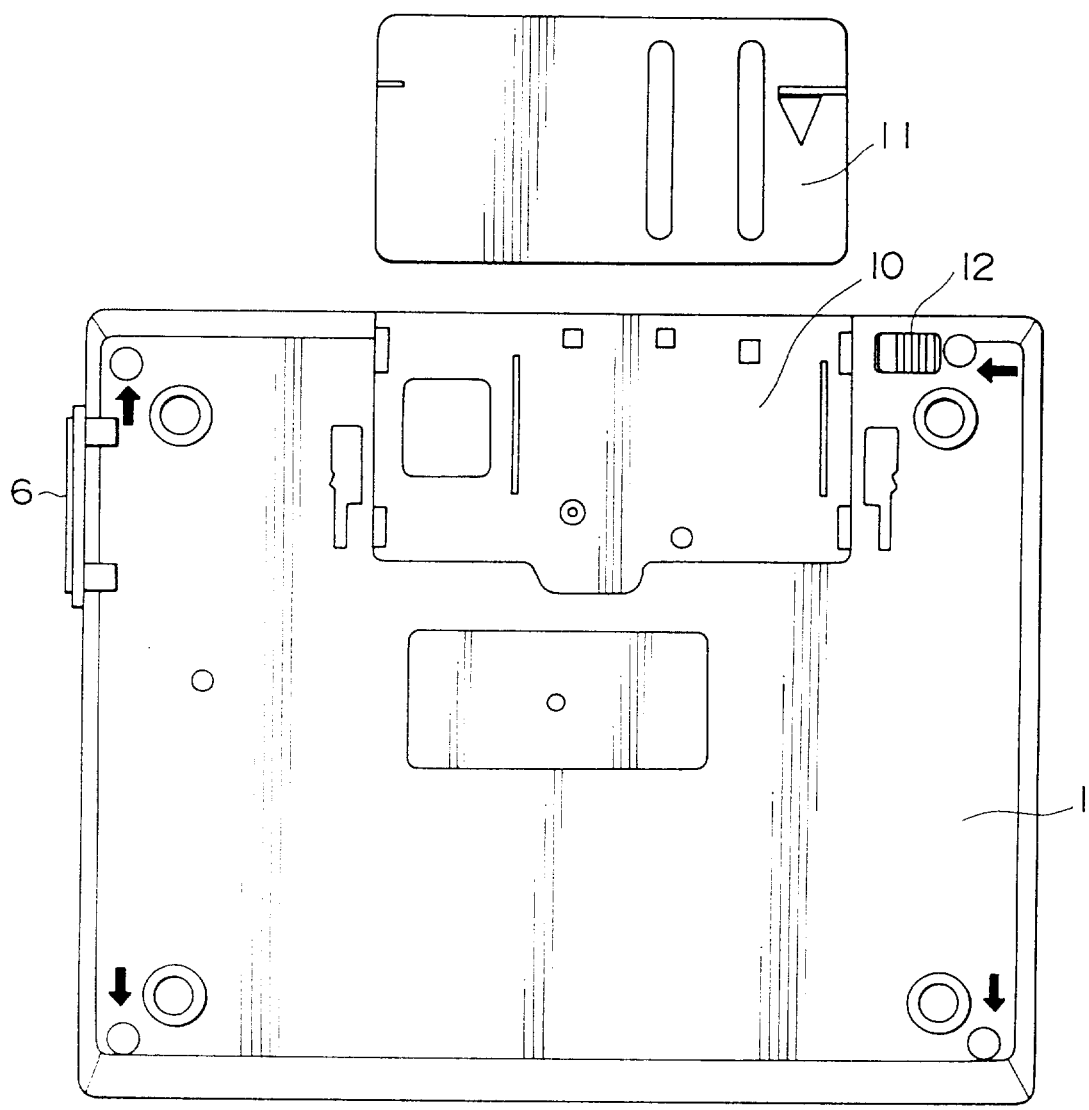
FIG. 4 is a bottom view of the embodiment of FIG. 1.

In the bottom face of the housing 1, as shown in FIG. 4, there is formed a hole 10 for receiving a battery 11. When the battery 11 is loaded in the hole 10, the hole 10 is blocked up by the battery 11. The battery 11 can be removed by sliding a slide button 12 to the left in FIG. 4.

Figure 5:
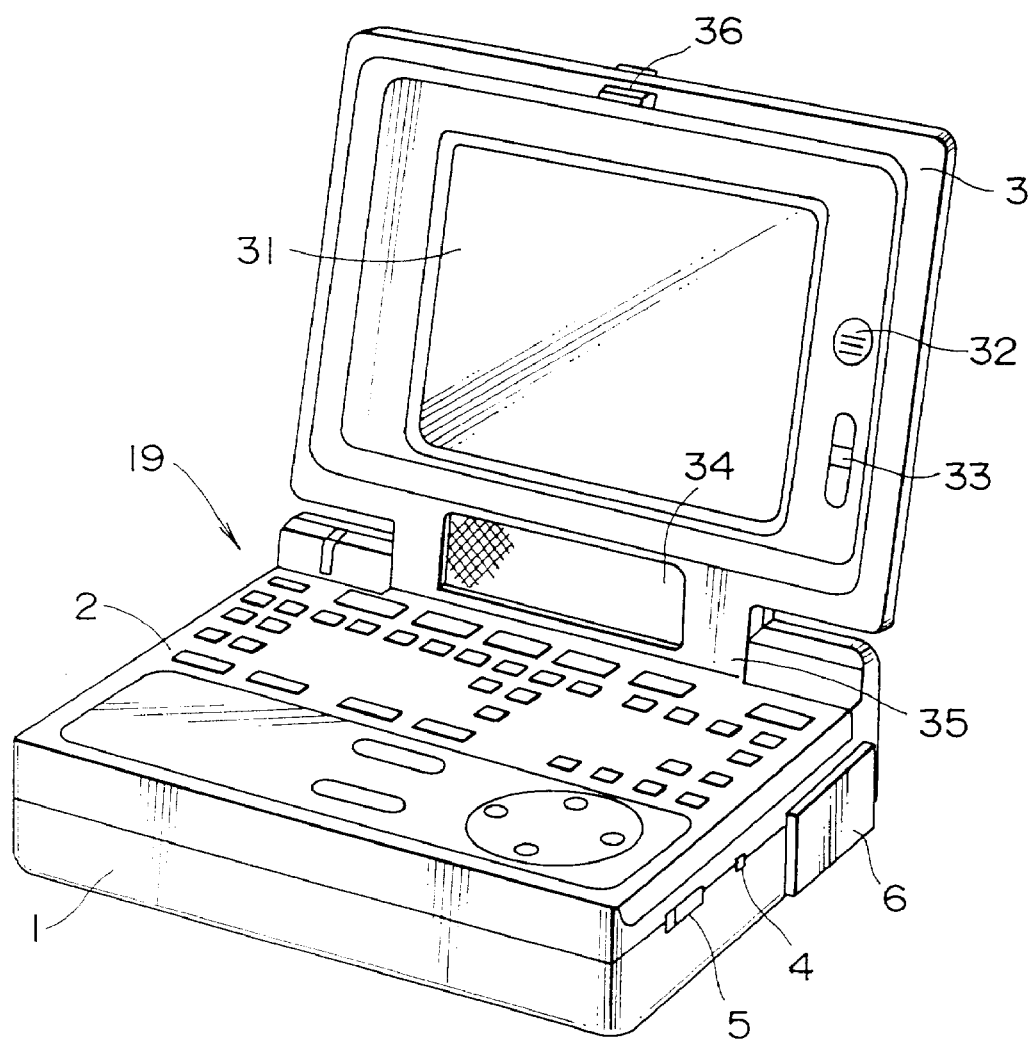
FIG. 5 is a perspective view of the embodiment of FIG. 1 with its outer lid 3 opened.
Figure 6:
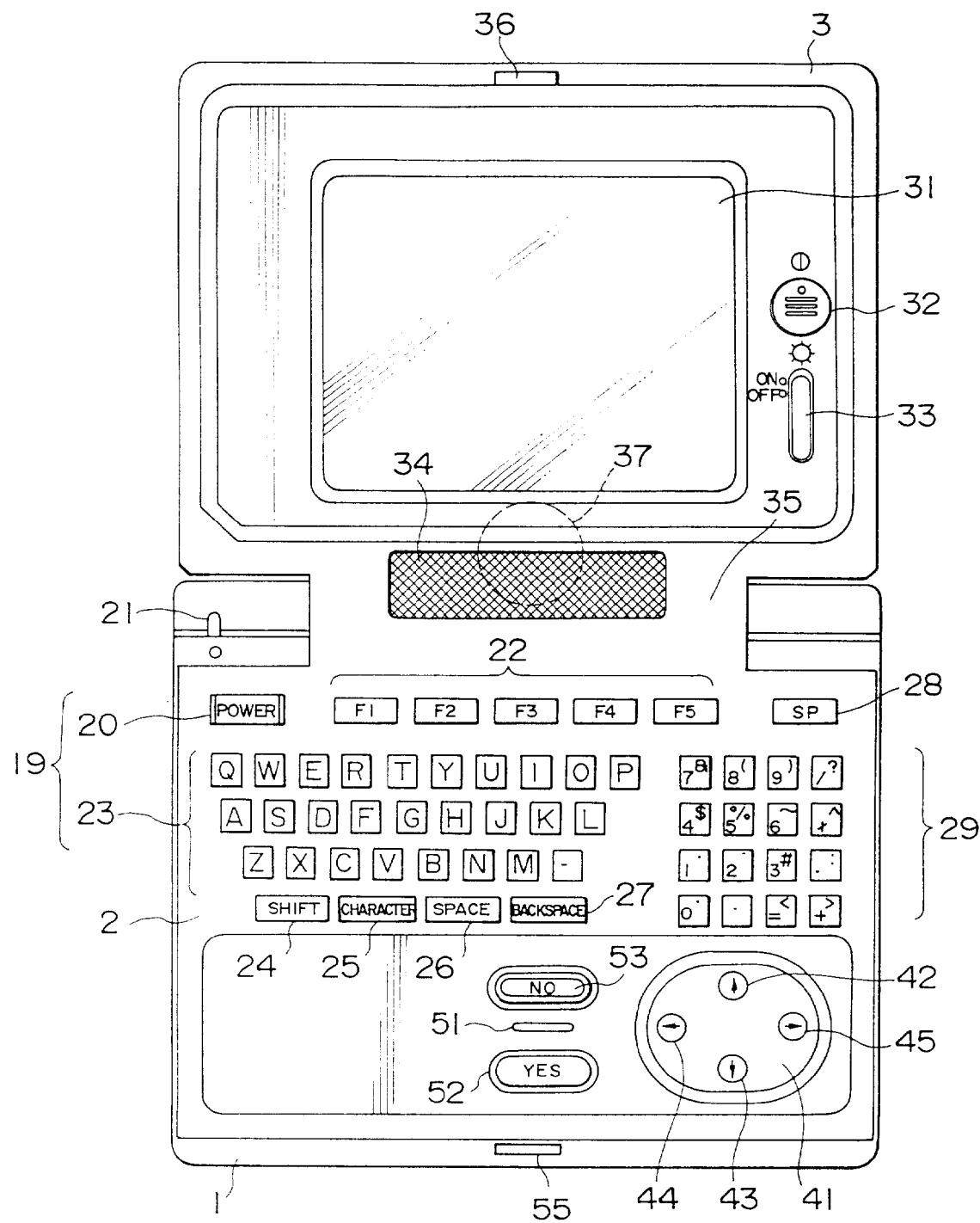
FIG. 6 is a plan view of the embodiment of FIG. 1 with its outer lid 3 opened 180 degrees.

FIG. 5 and FIG. 6 show external structure of the housing 1 with the outer lid 3 opened away from the housing 1. As shown in FIG. 5, as the outer lid 3 is rotated away from the housing 1, the inner lid 2 is exposed. On the top face of the inner lid 2, there are provided various operating buttons 19. Details of the operating buttons 19 are shown in FIG. 6. At the top left-hand corner of the inner lid 2, there is provided a power button 20 to be operated when turning on and off the power supply. When the power is turned on by operating the power button 20, a power lamp 21 at the top left-hand corner of the top face of the housing 1 is lighted. This power lamp 21 goes out when the power is turned off. Further, when the voltage of the battery 11 falls below a predetermined reference value while the apparatus is in operation on the battery 11 without receiving a DC power supply through the jack 8, the power lamp 21 flashes. The power lamp 21 is so arranged that its on or off state can be observed not only with the outer lid 3 opened but also with the outer lid 3 shut.

To the right of the power button 20, there are provided five function keys (F1 to F5) 22. When one of the function keys 22 is operated, an operation assigned to the key is performed. From the center to the left of the inner lid 2, there are disposed letter keys 23 for inputting alphabetical letters. Below the same, there are disposed a shift key (SHIFT) 24, a character key (CHARACTER) 25, a space key (SPACE) 26, and a backspace key (BACKSPACE) 27. The shift key 24 is operated together with a letter key 23 when for example inputting a capital letter of the alphabet. The backspace key 27 is used when erasing a letter displayed on the left-hand side of the cursor in the later described display portion 31. The character key 25 is operated together with a letter key 23 when for example inputting a German letter with an umlaut.

To the right of the letter keys 23, there are disposed numeric keys 29 for inputting numeric characters. Above the numeric keys 29, there is provided a special key (SP) 28. The SP key 28 is operated when a changed program is to be operated, i.e., when an input mode is selectively changed to English input mode, German input mode, or French input mode, or when the time for automatic power-off time is selectively changed.

Below the numeric keys 29, there is provided a operating plate 41 with arrowheads 42 to 45 marked thereon pointing up and down and left and right. By depressing the portion with any of the arrowheads 42 to 45 marked therein of the operating plate 41, the cursor on the display can be shifted in position upward, downward, leftward, or rightward. To the left of the operating plate 41, there is formed a linear projection 51, and there are provided a NO key 53 and a YES key 52 above and below the linear projection 51. By placing for example the index finger on the linear projection 51, the thumb on the YES key 52, and the middle finger on the NO key 53, the desired key :can be operated without looking at it. Further, to make it possible to discriminate between the YES key 52 and the NO key 53 only by touching the key with the finger, it is arranged such that the YES key 52 has a convex surface and the NO key 53 has a concave surface.

The YES key 52 and the NO key 53 are used for giving an affirmative answer and a negative answer, respectively. These keys are correspondent to the enter key (ENTER) and the escape key (Esc) (both being not shown) in an personal computer and assigned corresponding key codes (0DH or 1BH).

In the middle of the inner side of the outer lid 3, there is provided a display portion 31 formed of an LCD 100 (refer to FIG. 9) with 320×200 dots, on which images reproduced from the CD-ROM 66, letters, numeric characters, and the like, input by operating the letter keys 23 and numeric keys 29 are displayed. To the right of the display portion 31, there is provided a knob 32 which is rotated clockwise or counterclockwise when adjusting the contrast of the display portion 31. Below the knob 32, there is provided a slide button 33, which is slid upward or downward in FIG. 6 when turning on or off the back light (not shown) disposed inside the display portion 31 (on the backside of the LCD 100).

In a connecting portion 35 between the outer lid 3 and the housing 1 (below the display portion 31), there is provided a sound radiating portion 34 in the plane facing the housing 1 (inner lid 2) and, in its interior, there is disposed a speaker 37. Since the speaker 37 (sound radiating portion 34) and the display portion 31 are disposed in the same plane, the speaker 37 and the display portion 31 face the same direction. Accordingly, the user lusing the apparatus while facing to the display portion 31 can hear the sound output from the speaker 37 more easily than when the speaker 37 is disposed, for example, on the side face of the outer lid 3.

At the end of the inner side of the outer lid 3 (toward the top in FIG. 6), there is formed a hook 36 which is locked to a lock portion 55 of the housing 1 when the outer lid 3 is shut.

Figure 7:
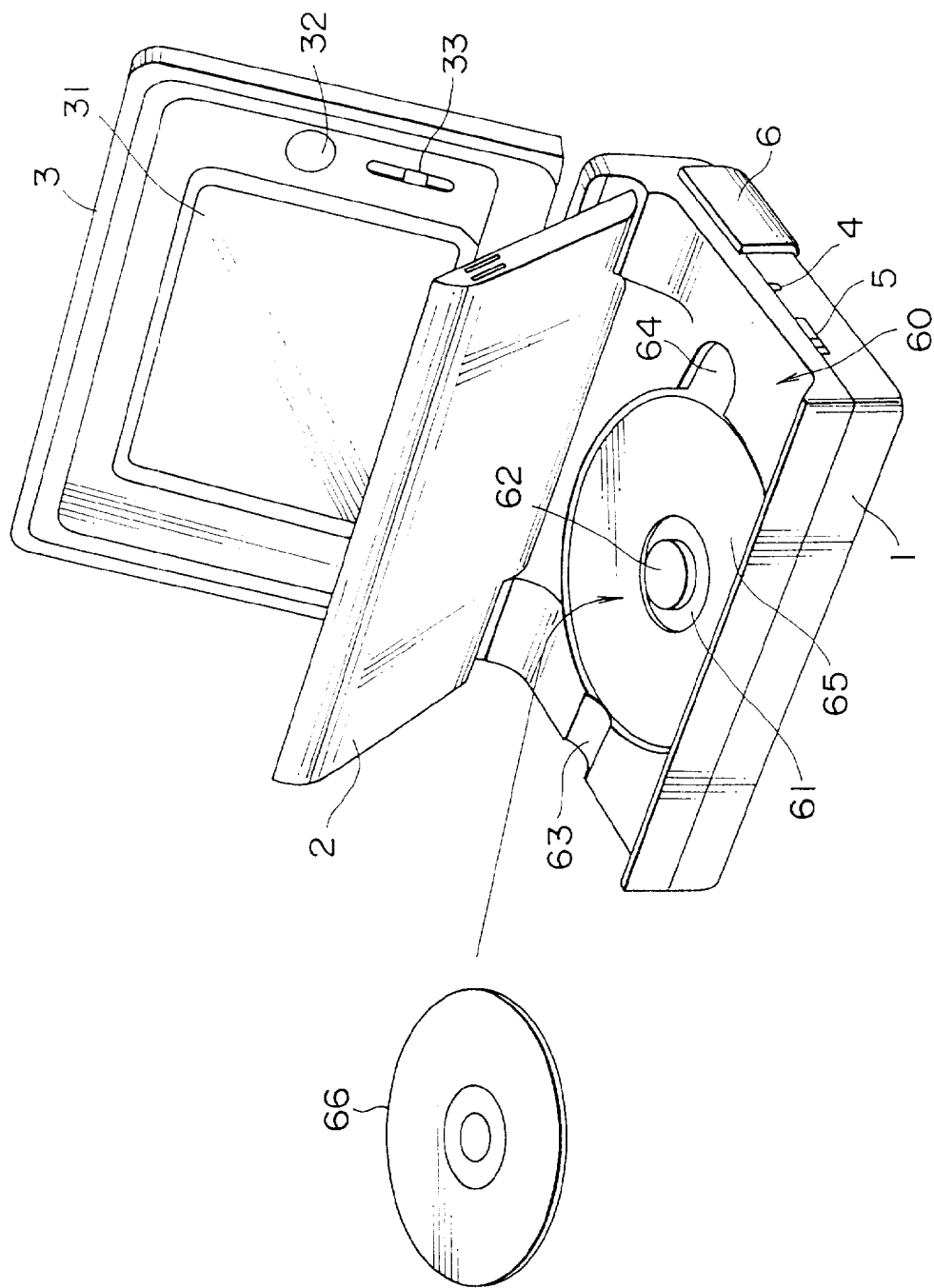
FIG. 7 is a perspective view of the embodiment of FIG. 1 with its outer lid 3 and inner lid 2 opened.
Figure 8:
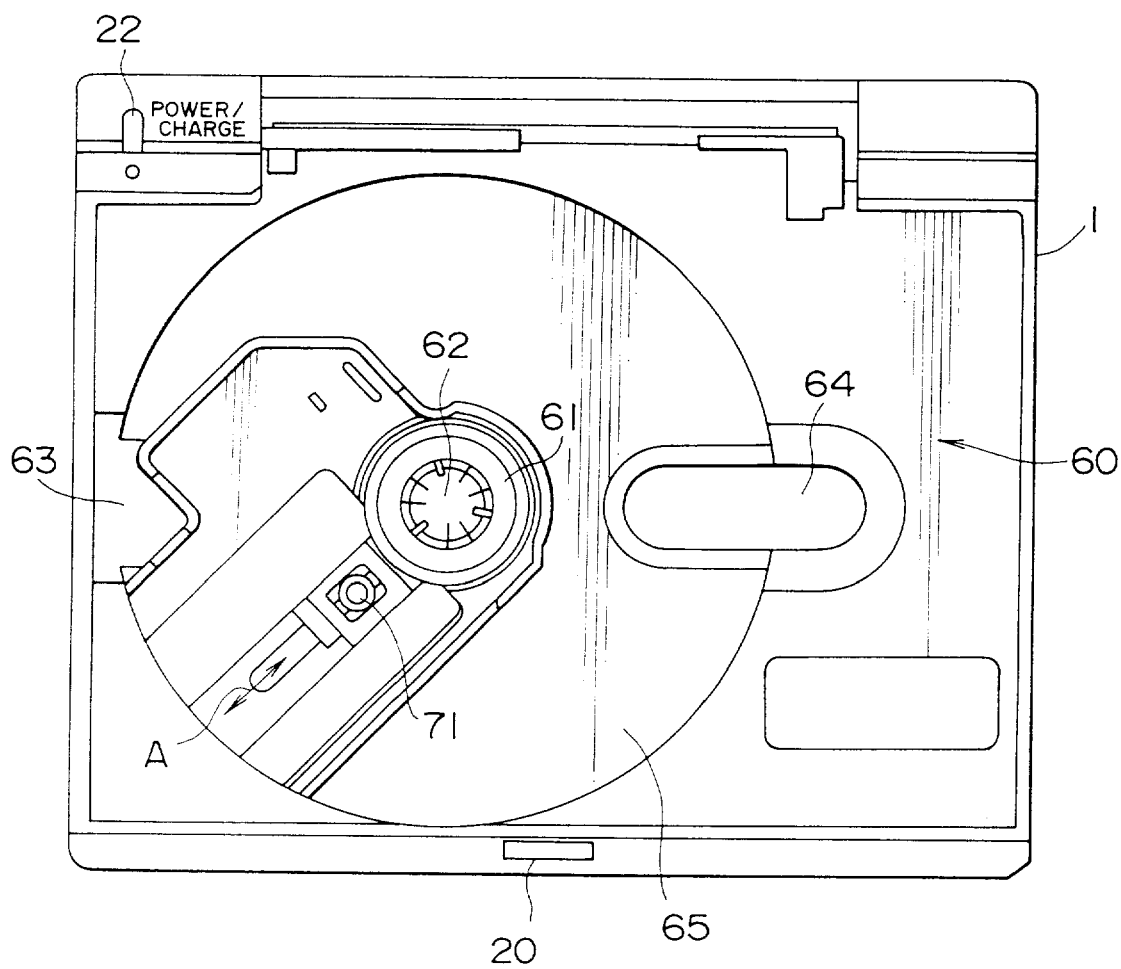
FIG. 8 is a plan view of the embodiment of FIG. 1 with its outer lid 3 and inner lid 2 removed.

FIG. 7 and FIG. 8 show the apparatus with the inner lid 2 opened or removed. Namely, FIG. 7 shows the apparatus with the inner lid 2 opened and FIG. 8 shows the same with the outer lid 3 and inner lid 2 removed from the housing 1.

As shown in FIG. 7, when the outer lid 3 is rotated around the housing 1 and then the inner lid 2 is also rotated around the housing 1 so that both the lids are opened, there is exposed a mounting portion 60 of the CD-ROM 66 formed at the upper portion of the housing 1. In the center of the mounting portion 60, there is disposed a turn table 61, and in the center of the same, there is formed a chuck portion 62. In the reproduction of the CD-ROM 66, if the CD-ROM 66 is mounted on the turntable 61, the CD-ROM 66 is chucked by the chuck portion 62. Thereby, even if the turntable is rotated at high speeds, the CD-ROM 66 is prevented from coming off the turntable 61. At the circumferential portion of the turntable 61, there is formed a recessed portion 65 of a size substantially corresponding to the CD-ROM 66, which allows the CD-ROM 66 to revolve without touching the housing 1. Further, there are formed recessed portions 63 and 64 communicating with and outwardly extending from the recessed portion 65. By inserting the fingers into the recessed portions 63 and 64, the CD-ROM 66 is easily mounted on and demounted from the turntable 61.

In the interior of the housing 1, as shown in FIG. 8, there is disposed an optical pickup 71 for movement in the directions indicated by the arrowheads A in the diagram (radial directions of the CD-ROM 66). To provide such movement, there is installed a thread motor (not shown) within the housing 1 for shifting the optical pickup 71 in the radial directions of the CD-ROM 66. Further, the optical pickup 71 has a focus actuator (not shown) and a tracking actuator (not shown) so that servo control can be applied to the pickup 71 both in the focusing direction and in the tracking direction.

Figure 9:
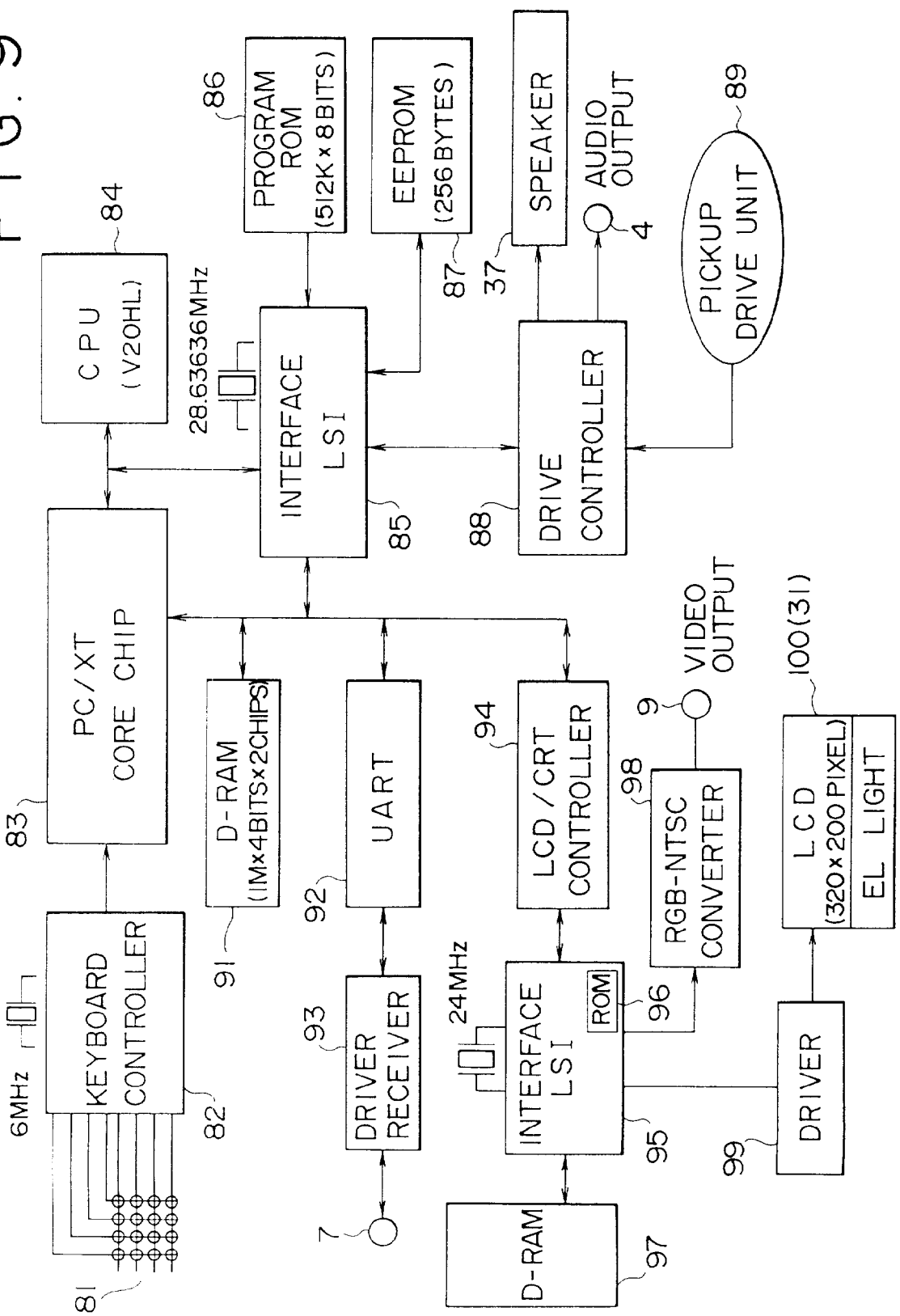
FIG. 9 is a block diagram showing electrical structure of the embodiment of FIG. 1.
Figure 10:
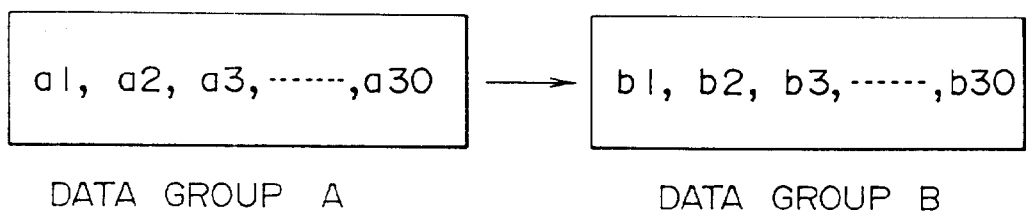
FIG. 10 is a diagram explanatory of the process for calculating luminance data from color data.

FIG. 9 shows the configuration of the circuit incorporated in the housing 1. A key matrix 81 detects the operation of the operating button 19 on the inner lid 2 and outputs the detection signal to a keyboard controller 82 constituted of a one-chip microcomputer. The keyboard controller 82 operates at a clock of 6 MHz and outputs a signal corresponding to the operation of the operating button 19 to a core chip 83.

The core chip 83 performs the processing to make programs and data supplied from the CD-ROM 66 compatible with IBM personal computer PC/XT (trademark of IBM). The core chip 83 is connected with the main CPU (NEC V20HL (trademark of NEC)) 84 for controlling each part. The CPU 84 operating at a clock of 9.54545 MHz is connected with a ROM 86, an EEPROM 87, and a drive controller 88 through an interface LSI 85 operating at a clock of 28.63636 MHz.

The ROM 86 stores programs which the CPU 84 needs in its operations. The programs include, other than the system program, changed programs to be executed when the SP key 28 is operated, programs for securing compatibility of programs and data between reproducing apparatuses (programs) of different versions, etc. The EEPROM 87 stores, as occasion demands, data which are to be retained after power is turned off. The drive controller 88 connected with a pickup drive unit 89 demodulates reproduced data from the CD-ROM 66 supplied from the pickup drive unit 89 and outputs, of the reproduced data, the audio signal to the speaker 37 and the jack 4 (FIG. 2) and the video data to the interface LSI 85.

The interface LSI 85 is connected with each of the core chip 83, a D-RAM 91 as the main memory, a UART (Universal Asynchronous Receiver/Transmitter) 92, and an LCD/CRT controller 94 through a bus for exchanging data therewith. The D-RAM 91 stores data supplied from the core chip 83, interface LSI 85, UART 92, and the LCD/CRT controller 94 as the need arises. The UART 92 performs the process necessary for generating data in accordance with the RS232C standard and outputs the data to a driver/receiver 93. The driver/receiver 93 delivers its output to the plug 7 (FIG. 2). Further, RS232C data input from the plug 7 is converted into voltage by the driver/receiver 93 and input to the UART 92. The UART 92 converts the input data into data which can be processed by the CPU 84.

The LCD/CRT controller. 94 controls the operation for displaying. More specifically, the LCD/CRT controller 94 causes the video signal to be output to the LCD 100 or the video output terminal 9 to be written into the D-RAM 97 through the interface LSI 95. The D-RAM 97 is a video RAM on which bit map data corresponding to the picture to be displayed is developed. The interface LSI 95 has a ROM 96 storing tables used for gradation conversion of the displayed image. A converter 98 converts RGB color data for computer output from the interface LSI 95 into a video signal for the NTSC color television system and outputs the video signal to the output terminal 9. Further, a driver 99 supplies black-and-white video data output from the interface LSI 95 to the LCD 100 so as to be displayed thereon. The driver 99, in accordance with the operation made with the knob 32 or the slide button 33 (FIG. 5 and FIG. 6), also performs the contrast control of the LCD 100 and on/off control of the back light (EL light). The LCD 100, together with the back light, is provided in the display portion 31.

Now, operations of the embodiment shown in FIG. 9 will be described. When the operating button 19 (FIG. 6) is operated, the operated key is detected by the key matrix 81. The detection signal is input to the CPU 84 through the keyboard controller 82 and the core chip 83. The CPU 84 performs the processing corresponding to the command from the operated key in accordance with programs stored in the ROM 86 or the D-RAM 91.

For example, if the command is to reproduce the CD-ROM 66 (FIG. 7), the CPU 84 controls the drive controller 88 through the interface LSI 85 so that the pickup drive unit 89 is driven. The pickup drive unit 89 drives the optical pickup 71 (FIG. 8) so that the information written in the CD-ROM 66 is reproduced. The drive controller 88 demodulates the signal supplied from the pickup drive unit 89 and outputs the audio signal to the jack 4 and the speaker 37. Thereby, the audio signal reproduced from the CD-ROM 66 can be heard through the speaker 37 or a headphone. The volume at this time can be controlled by operating the volume button 5 (FIG. 2 and FIG. 5). When the headphone is connected to the jack 4, the supply of the audio signal to the speaker 37 is suspended and the audio signal is supplied only to the headphone.

When the audio signal is played back by the speaker 37, not only the air in front of the speaker 37 (outside the outer lid 3) vibrates but also the air inside the outer lid 3 vibrates. When the outer lid 3 is opened, the vibration of air generated outside the outer lid 3 is scatteredly radiated into the open air and produces virtually no effect on the vibration of air within the housing 1. Further, since the outer lid 3 is structured to be independent of the housing 1, the possibility of the vibration of air inside the outer lid 3 being transmitted as vibration of air inside the housing 1 is not great. Accordingly, the servo system for driving the optical pickup 71 inclusive of the focus actuator, tracking actuator, and the thread motor housed in the housing 1 is prevented from malfunctioning on account of the air vibration from the speaker 37.

On the other hand, the video data reproduced from the CD-ROM 66 is output from the drive controller 88 and delivered through the interface LSI 85 to the D-RAM 91 and temporarily written therein. If necessary, this data is processed by the core chip 83 to be given compatibility with data of IBM personal computer PC/XT. The CPU 84 supplies the video data to the D-RAM 97 to be stored therein through the LCD/CRT controller 94 and the interface LSI 95. The video data developed on the D-RAM 97 is read through the interface LSI 95 by the LCD/CRT controller 94 and the read data is output through the driver 99 to the LCD 100 (display portion 31) to be displayed thereon. At this time, the LCD/CRT controller 94, when an instruction to change the gradation is issued, controls the interface LSI 95 so that the pixel data having gradations thereof is converted according to the table stored in the ROM 96 and output. The change of the gradation is effected by the control of the number of times of transmission (nontransmiission) of light through the pixels of the LCD 100 per unit time.

When a CRT or the like is connected to the video output terminal 9, the LCD/CRT controller 94 controls the driver 99 through the interface LSI 95 to thereby put off the back light of the LCD 100 and stops displaying of the image thereon. The video data read from the D-RAM 97 is converted by the converter 98 to a video signal for the NTSC system and output to the video output terminal 9. As a result, it is made possible to monitor an image based on the video data read out from the CD-ROM 66 on the CRT in the NTSC system. At this time, the audio signal from the jack 4 or the speaker 37 remains to be output.

Audio data, video data, or text data are converted to RS232C data by the UART 92 and output through the driver/receiver 93 from the plug 7 according to the need.

Below will be given description of the operation for gradation conversion of the video data. First, the LCD/CRT controller 94 calculates luminance data Y from R, G, and B color data according to the following expression $$Y=0.299R+0.587G+0.144B.$$

Thereby, a data group A (a1, a2, a3, . . . , a30) is converted to a data group B (b1, b2, b3, . . . , b30) as shown in FIG.

10. An example of the data group B thus calculated is shown in Table 1.

TABLE 1

| b1 = 15% | b2 = 26% | b3 = 30% |
| b4 = 33% | b5 = 38% | b6 = 40% |
| b7 = 42% | b8 = 43% | b9 = 45% |
| b10 = 45% | b11 = 45% | b12 = 46% |
| b13 = 46% | b14 = 47% | b15 = 48% |
| b16 = 49% | b17 = 49% | b18 = 51% |
| b19 = 53% | b20 = 55% | b21 = 58% |
| b22 = 58% | b23 = 59% | b24 = 60% |
| b25 = 60% | b26 = 61% | b27 = 62% |
| b28 = 65% | b29 = 70% | b30 = 82% |

The ROM 96 of the interface LSI 95 has four tables of gradation conversion characteristics for example as shown in FIG. 11. Referring to FIG. 11, Y0 to Y7 represent the eight gradations (levels of brightness) which the LCD 100 can display and are of fixed values. Y0 represents black and Y7 represents white, while Y1 to Y6 represent gradations disposed between Y0 and Y7 at equal intervals. The characteristic of FIG. 11(a) is allinear characteristic and therein the input data is assigned to the eight gradations Y0 to Y7 at equal intervals.

Figure 11A:
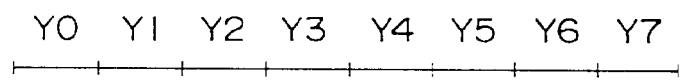
FIG. 11 is a diagram explanatory of tables stored in the ROM 96 in FIG. 9.
Figure 12:
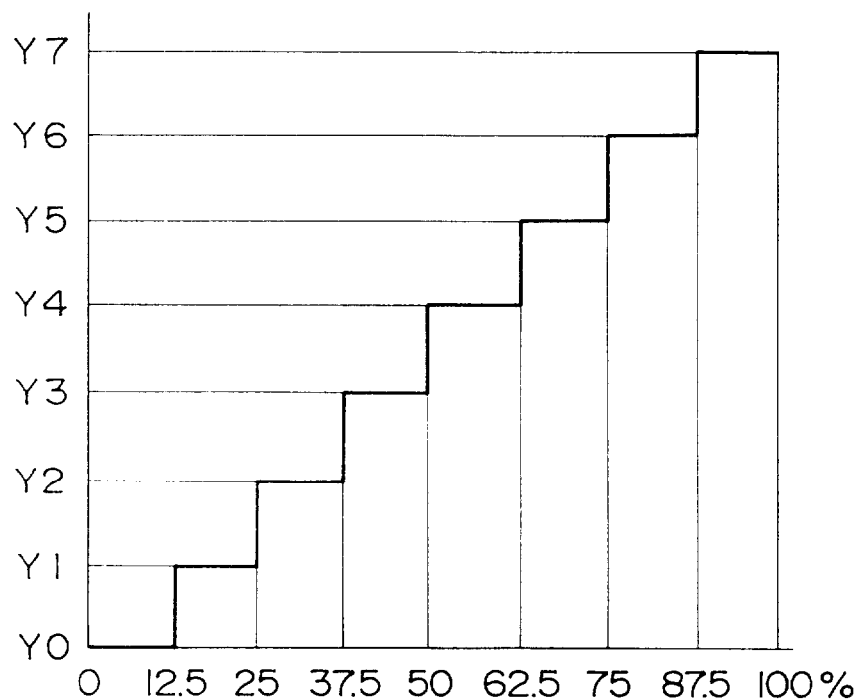
FIG. 12 is a diagram explanatory of the principle of linear gradation conversion.

FIG. 12 shows the conversion characteristic of FIG. 11(a) in a different way. More specifically, in FIG. 12, the brightness of the input data is equally divided into n ranges corresponding to gradations which the LCD 100 can display. Since n=8 in the case of the present embodiment, one range corresponds to 12.5% (=100/8). Namely, the data whose brightness is in the range from 0 to 12.5% is displayed as Y0 (black) and the data in the range from 87.5 to 100% is displayed as Y7 (white). The data in between, i.e., the data whose levels of brightness are in the ranges from 12.5 to 25%, 25 to 37.5%, 37.5 to 50%, 50 to 62.5%, 62.5 to 75%, and 75 to 87.5% are converted to the gradations from Y1 to Y6, respectively, between the gradations Y0 and Y7.

Figure 11B:
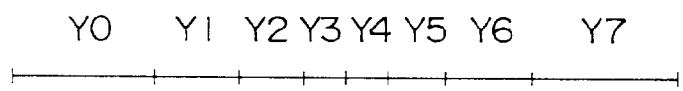
Figure 11C:
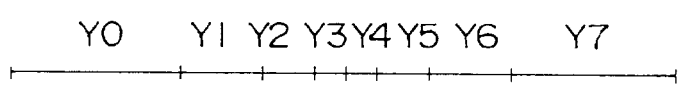
Figure 11D:
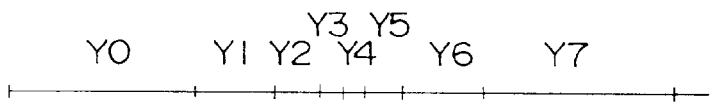

In contrast to the above, the characteristics shown in FIG. 11(b) to FIG. 11(d) are arranged to be nonlinear, i.e., the intervals of brightness of the input data assigned to the gradations Y0 to Y7 are not equal. The intervals for medium brightness are set to be narrower than the intervals around the minimum or maximum brightness.

Figure 13:
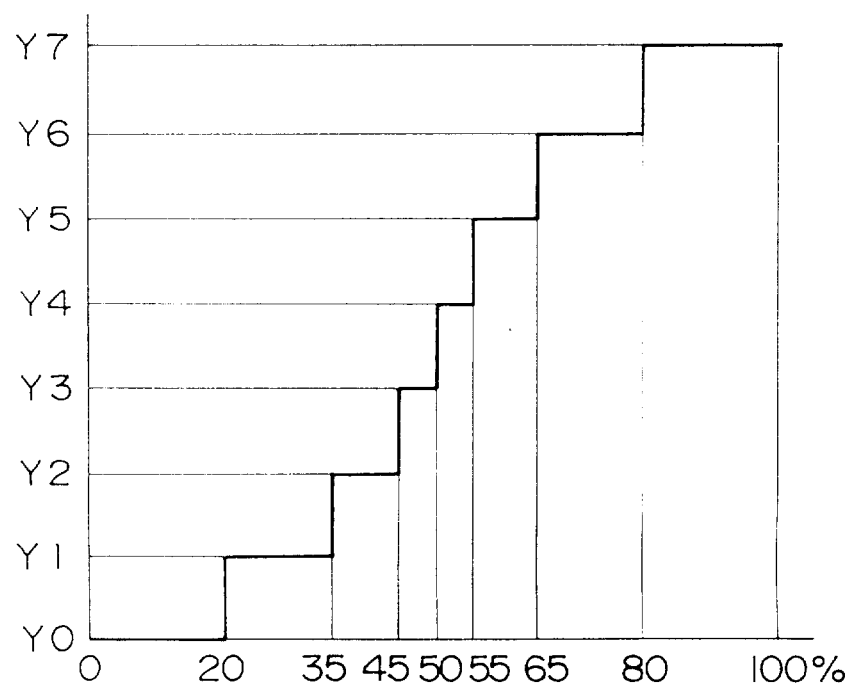
FIG. 13 is a diagram explanatory of a gradation conversion characteristic for nonlinearly converting brightness into eight gradations.

FIG. 13 expresses the conversion characteristic of FIG. 11(b) in the different way (in the same way as used in FIG. 12). In this case, the data whose brightness is in the range from 0 to 20% is displayed as Y0 (black) and the data in the range from 80 to 100% is displayed as Y7 (white). The data in between, i.e., the data whose levels of brightness are in the ranges from 20 to 35%, 35 to 45%, 45 to 50%, 50 to 55%, 55 to 65%, and 65 to 80% are converted to the gradations from Y1 to Y6, respectively, between the gradations Y0 and Y7. Thus, when the brightness of the input data is closer to the medium brightness (brightness of 50%), the brightness of the input data is assigned to a narrower range. When the brightness of the input data is closer to the minimum (0%) or the maximum (100%), the brightness of the input data is assigned to a wider range.

While the diagrams showing the conversion characteristics of FIG. 11(c) and FIG. 11(d) in the different way are omitted, they are such that the intervals of brightness along the axis of abscissas are still narrower around the medium brightness.

FIG. 14 shows distribution of converted data among each of the gradations when the brightness of data of the data group B shown in Table 1 has been linearly converted into eight gradations Y0 to Y7, according to FIG. 11(a). In contrast to the above, FIG. 15 shows distribution of converted data among each of the gradations when the brightness of the same data has been nonlinearly converted into eight gradations Y0 to Y7, according to FIG. 11(b). While the distribution in FIG. 14 is such that there is one peak of brightness, it is known that there are existing two peaks in the distribution of FIG. 15. It is thus made possible to obtain an image which is easier to see in the case of FIG. 15, in which pixels are scatteredly distributed over wider ranges around medium gradation, than in the case of FIG. 14.

Selection and setting of any of the four characteristics in FIGS. 11(a) to 11(d) can be achieved by the user giving commands to the CPU 84 by operating the numeric keys 29, the operating plate 41, and the like. It is also possible to record such codes in the CD-ROM 66 as to select the gradation conversion characteristic whereby an image with optimum gradations which is easier to see can be displayed. In this case, the CPU 84 reads the codes and selectively sets up the suitable characteristic according to the result of the reading.

While, in the foregoing, the case where the present invention is applied to CD-ROM reproducing apparatus has been described as an example, the present invention can further be applied to the cases displaying images in such apparatuses as personal computers, word processors, and game machines.

According to the display controlling apparatus as described above, since it is arranged such that video data is converted for gradation with a nonlinear characteristic, pixels can be scatteredly distributed over wider ranges and, hence, an image easier to see can be obtained.

Further, according to the gradation conversion method of the present invention, color data is converted into luminance data and the luminance data is converted nonlinearly into data with a predetermined number of gradations. Therefore, a color image can be simply converted into a monochromatic (a predetermined single-colored or a black-and-white) image which is easier to see.

What is claimed is:
1. An apparatus for controlling a display, the apparatus comprising:
   data storage means for storing video data corresponding to an image to be displayed;
   gradation conversion means for converting said video data to data having a predetermined number of gradations each respectively corresponding to a predetermined gradation range, with a nonlinear characteristic such that gradation ranges are denser around a medium gradation than around maximum and minimum gradations; and
   output means for outputting said video data converted to data having a predetermined number of gradations by said gradation conversion means.

2. An apparatus for controlling a display according to claim 1, wherein:
   said gradation conversion means is also capable of gradation converting with a linear characteristic, and
   said apparatus for controlling a display further comprises gradation setting means for setting the characteristic of said gradation setting means to either of nonlinear and linear characteristics.

3. An apparatus for controlling a display according to either of claims 1 or 2, further comprising characteristic storage means for storing said conversion characteristics as tables.

4. An apparatus for controlling a display according to either of claims 1 or 2, further comprising display means for displaying an image corresponding to said video data output from said output means.

5. An apparatus for controlling display according to either of claims 1 or 2, further comprising reproduction means for reproducing a recording medium in which said video data is recorded and sending said video data to said data storage means.

6. The apparatus for controlling a display according to claim 1, wherein said gradation conversion comprises:

means programmable to provide a plurality of nonlinear gradation characteristics; and means for selecting a nonlinear gradation characteristic of the plurality of nonlinear gradation characteristics which will produce the most even distribution of said video data converted to data having a predetermined number of gradations.

7. A method for gradation conversion comprising the steps of:

converting color data to luminance data; and converting said luminance data to data having a predetermined number of gradations each respectively corresponding to a predetermined gradation range, with a nonlinear characteristic such that gradation ranges are denser around a medium gradation than around a maximum or a minimum gradation; and programmably providing a variety of nonlinear gradation characteristics.

8. An apparatus for processing brightness data for display which can display a video image having brightness values between a minimum brightness and a maximum brightness, the apparatus comprising:

data storage means for storing a plurality of input brightness values for the video image;

gradation conversion means for converting each input brightness value to a one of a set of predetermined gradated brightness values, such that each predetermined gradated brightness value corresponds to a predetermined range of input brightness values, the predetermined gradated brightness values occur at regular intervals between the minimum and maximum brightness values, and the predetermined ranges of input brightness values are not evenly distributed between the minimum and maximum brightness values; and output means for outputting the brightness values which have been converted to gradated brightness values by the gradation conversion means.

9. An apparatus for processing color data for display which can display a video image having luminance values between a minimum luminance and a maximum luminance, the apparatus comprising:

data storage means for storing a plurality of input color values for the video image;

luminance conversion means for converting the plurality of input color values to a plurality of input luminance values;

gradation conversion means for converting each input luminance value to a one of a set of predetermined gradated luminance values, such that each predetermined gradated luminance value corresponds to a predetermined range of input luminance values, the predetermined gradated luminance values occur at regular intervals between the minimum and maximum luminance values, and the predetermined ranges of input luminance values are not evenly distributed between the minimum and maximum brightness values; and output means for outputting the luminance values which have been converted to gradated luminance values by the gradation conversion means.

* * * * *